(12) United States Patent
Betz et al.

(10) Patent No.: US 11,168,457 B2
(45) Date of Patent: Nov. 9, 2021

(54) FOUNDATION FOR A STRUCTURE

(71) Applicant: MAX BÖGL WIND AG, Sengenthal (DE)

(72) Inventors: Thorsten Betz, Neumarkt (DE); Michael Reitenspiess, Altdorf (DE)

(73) Assignee: MAXBÖGL WIND AG, Sengenthal (DE)

( * ) Notice: Subject to any disclaimer, the term of this patent is extended or adjusted under 35 U.S.C. 154(b) by 0 days.

(21) Appl. No.: 16/635,685

(22) PCT Filed: Aug. 1, 2018

(86) PCT No.: PCT/EP2018/070900
§ 371 (c)(1),
(2) Date: Jan. 31, 2020

(87) PCT Pub. No.: WO2019/025505
PCT Pub. Date: Feb. 7, 2019

(65) Prior Publication Data
US 2021/0123204 A1 Apr. 29, 2021

(30) Foreign Application Priority Data

Aug. 1, 2017 (DE) ...................... 10 2017 117 440.0
Sep. 6, 2017 (DE) ...................... 10 2017 120 526.8
Mar. 28, 2018 (DE) ...................... 10 2018 107 421.2

(51) Int. Cl.
*E02D 27/42* (2006.01)
*F03D 13/20* (2016.01)
(Continued)

(52) U.S. Cl.
CPC .......... *E02D 27/425* (2013.01); *E02D 27/08* (2013.01); *E04C 5/12* (2013.01); *E04H 12/12* (2013.01);
(Continued)

(58) Field of Classification Search
CPC ....... E02D 27/42; E02D 27/425; E02D 27/08; E02D 2600/30; E02D 2300/002;
(Continued)

(56) References Cited

U.S. PATENT DOCUMENTS 5,586,417 A    12/1996  Henderson et al.
5,746,036 A *  5/1998  Angelette ............... E02D 27/42
                                                        249/163
(Continued)

FOREIGN PATENT DOCUMENTS

CN              1934320 A        3/2007
CN           203 924 104 U      11/2014
(Continued)

OTHER PUBLICATIONS

International Search Report for application No. PCT/EP2018/070900, dated Nov. 20, 2018 and written opinion with English Translation.
(Continued)

*Primary Examiner* — Andrew J Triggs
(74) *Attorney, Agent, or Firm* — JK Intellectual Property Law, PA

(57) ABSTRACT

A foundation for a structure pre-stressed via a plurality of tensioning members includes a foundation slab and a suspension device cast into the foundation slab. The suspension device includes an anchor element, which may be an upper anchor plate, located at least as high as an upper side of the foundation slab, the anchor element for attachment to one of the tensioning members. The suspension device also includes a lower anchor plate located at least as low as within a lower third of the foundation slab. The structure may be a container, a tower or a wind turbine tower. The structure may include a stack of prefabricated concrete parts. The disclosure is also directed to the combined structure and (Continued)

foundation, and to a method of manufacturing a structure having a foundation.

21 Claims, 9 Drawing Sheets

(51) Int. Cl.
*E02D 27/08* (2006.01)
*E04C 5/12* (2006.01)
*E04H 12/12* (2006.01)
*E04H 12/16* (2006.01)
*E04H 12/34* (2006.01)

(52) U.S. Cl.
CPC ............ *E04H 12/16* (2013.01); *E04H 12/342* (2013.01); *F03D 13/22* (2016.05); *E02D 2250/0023* (2013.01); *E02D 2300/002* (2013.01); *E02D 2600/30* (2013.01)

(58) Field of Classification Search
CPC .......... F03D 13/22; E04H 12/16; E04H 12/12; E04C 5/12
See application file for complete search history.

(56) References Cited

U.S. PATENT DOCUMENTS

| | | | | |
|---|---|---|---|---|
| 6,594,968 | B2* | 7/2003 | Harris | F03D 13/22 |
| | | | | 52/741.15 |
| 8,037,646 | B2 | 10/2011 | Wobben | |
| 10,280,643 | B2* | 5/2019 | Chase | F03D 13/20 |
| 10,323,431 | B2* | 6/2019 | Lockwood | F03D 13/20 |
| 10,443,205 | B2* | 10/2019 | Menzel | E02D 27/42 |
| 10,954,686 | B2* | 3/2021 | Chase | F03D 13/10 |
| 2002/0066255 | A1* | 6/2002 | Harris | F03D 13/22 |
| | | | | 52/742.14 |
| 2009/0266016 | A1* | 10/2009 | Kraft | E02D 27/42 |
| | | | | 52/296 |
| 2010/0043318 | A1* | 2/2010 | Armbrecht | F03D 13/22 |
| | | | | 52/173.1 |
| 2011/0041438 | A1* | 2/2011 | Frost | E02D 27/42 |
| | | | | 52/296 |
| 2014/0250806 | A1* | 9/2014 | Schibsbye | E02D 5/80 |
| | | | | 52/223.13 |
| 2016/0169209 | A1* | 6/2016 | Coordes | F03D 13/20 |
| | | | | 52/169.13 |

FOREIGN PATENT DOCUMENTS

| | | |
|---|---|---|
| DE | 20 2010 007750 | 8/2010 |
| DE | 10 2009 016892 | 10/2010 |
| DE | 10 2013 105512 | 12/2014 |
| DE | 10 2013 108692 | 2/2015 |
| DE | 10 2015 219 655 A1 | 4/2017 |
| EP | 1 262 614 B2 | 12/2002 |
| EP | 2 738 322 A1 | 6/2014 |
| WO | WO 2014/202733 A1 | 12/2014 |
| WO | WO 2017/039975 A1 | 3/2017 |

OTHER PUBLICATIONS

International Preliminary Report on Patentability for International Application No. PCT/EP2018/070900, dated Feb. 4, 2020 with English Translation.
German Office Action for application No. 10 2017 117 440.0, dated Apr. 5, 2018, with English translation.
Chilean Office Action dated Jun. 16, 2021 with English Translation.
Office Action dated Mar. 2, 2021, for Application CN201880063495.9.

* cited by examiner

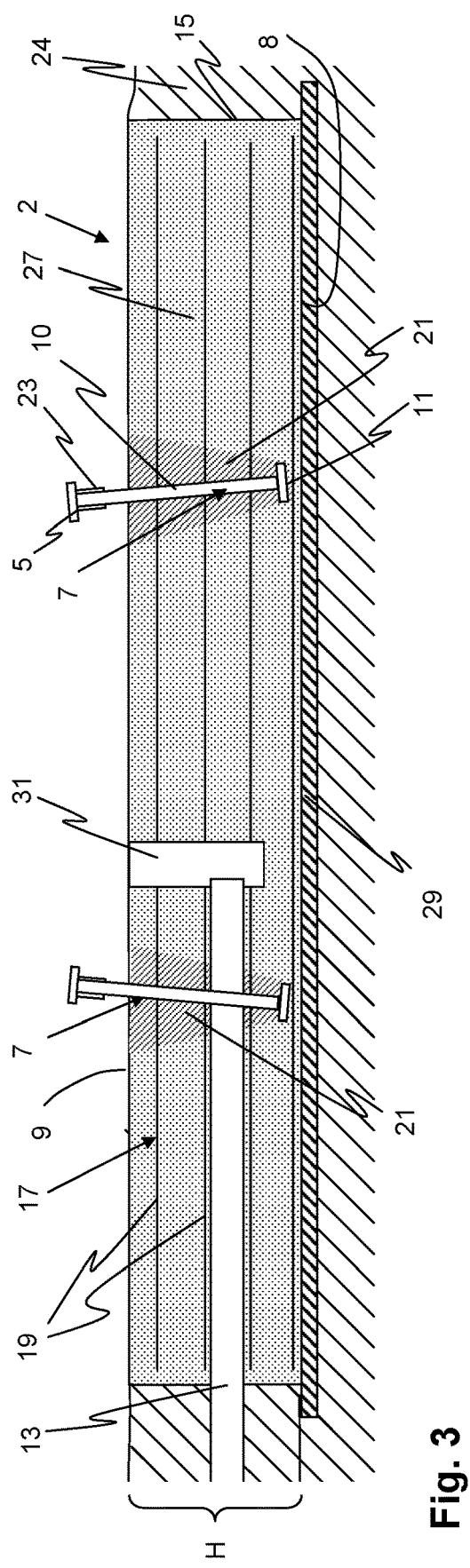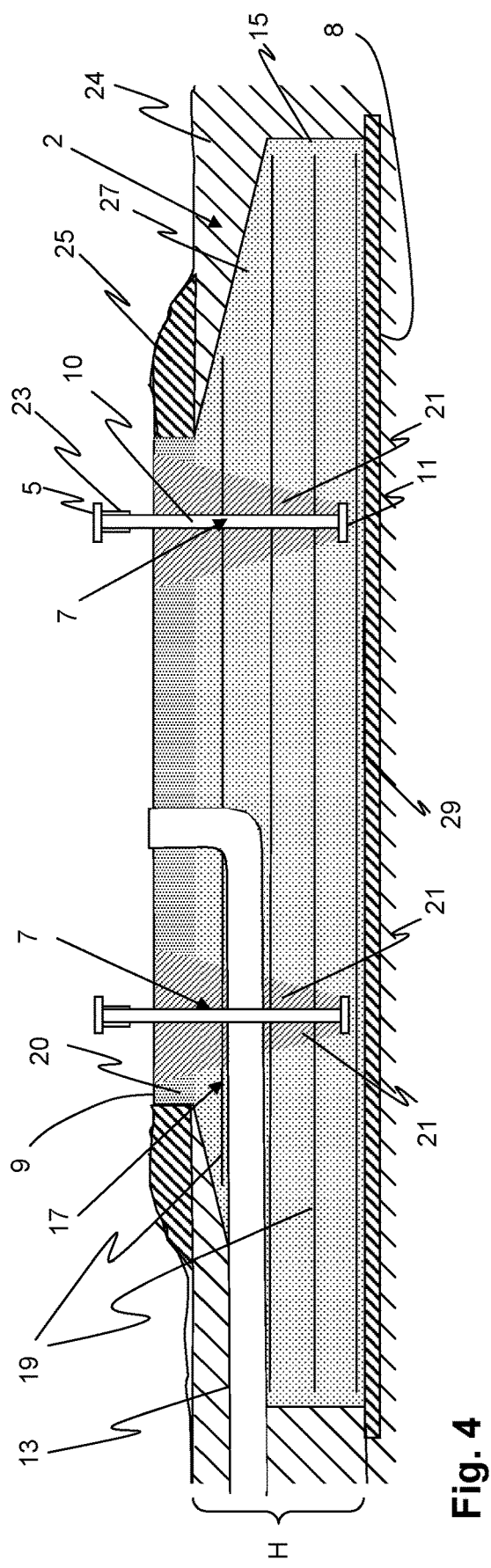

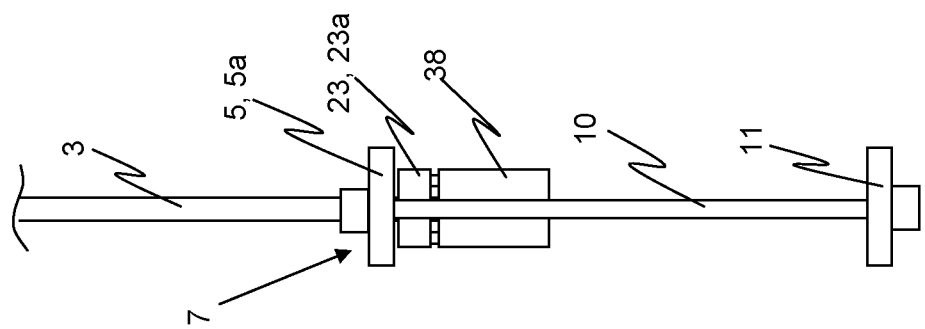
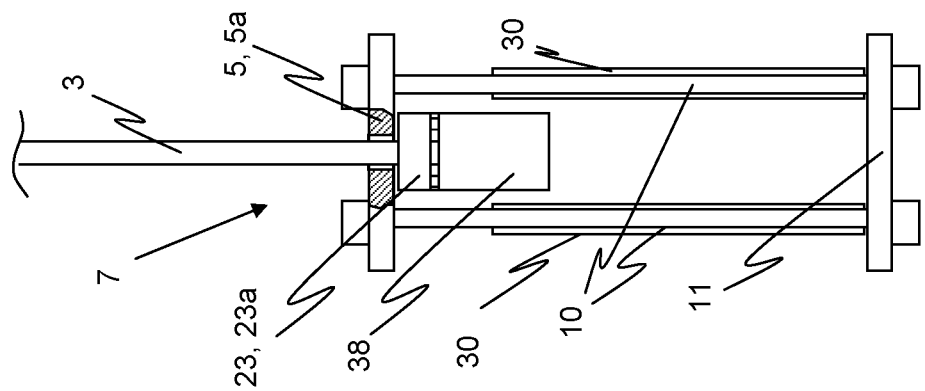
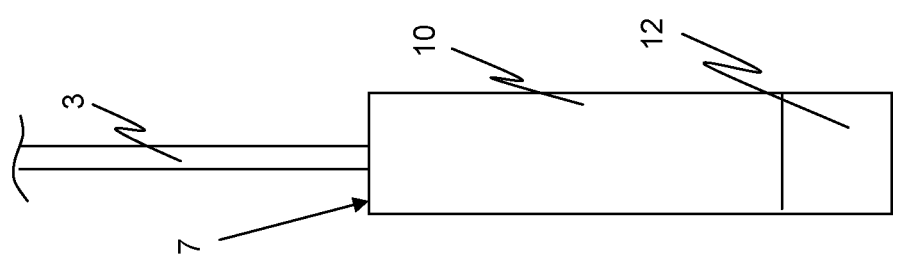
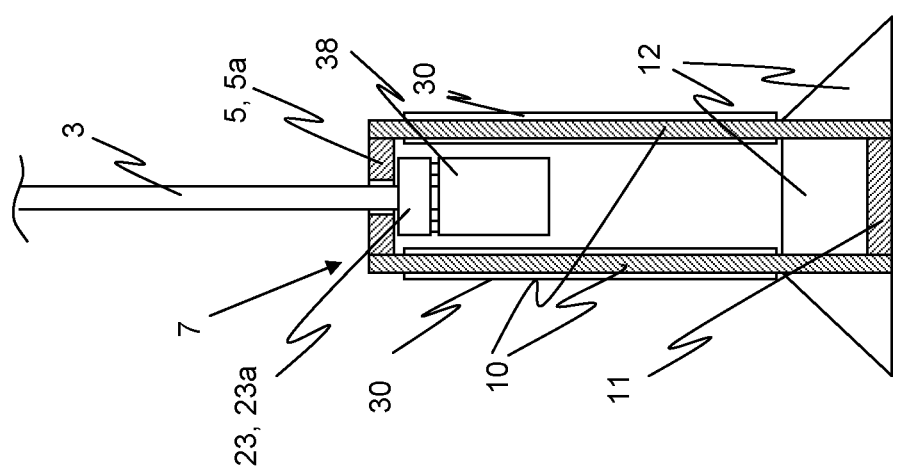

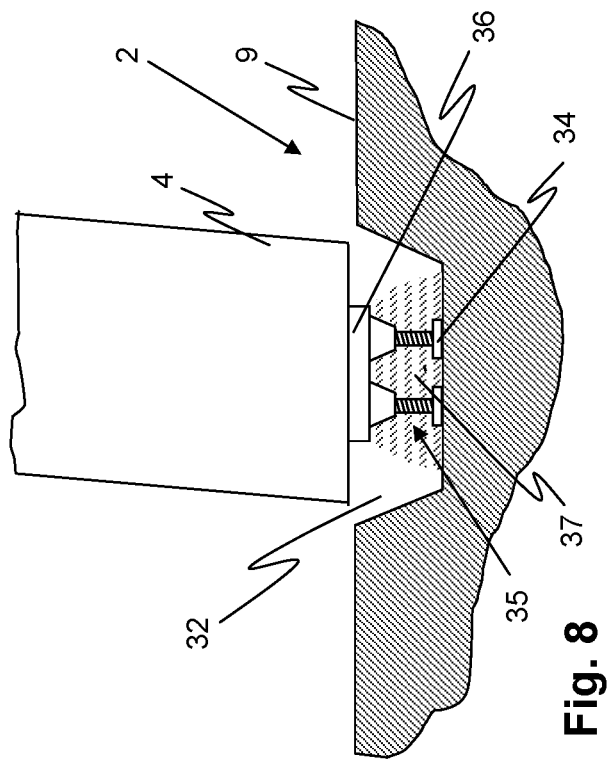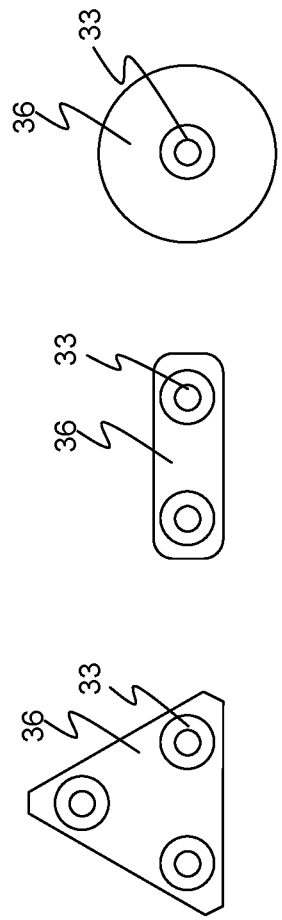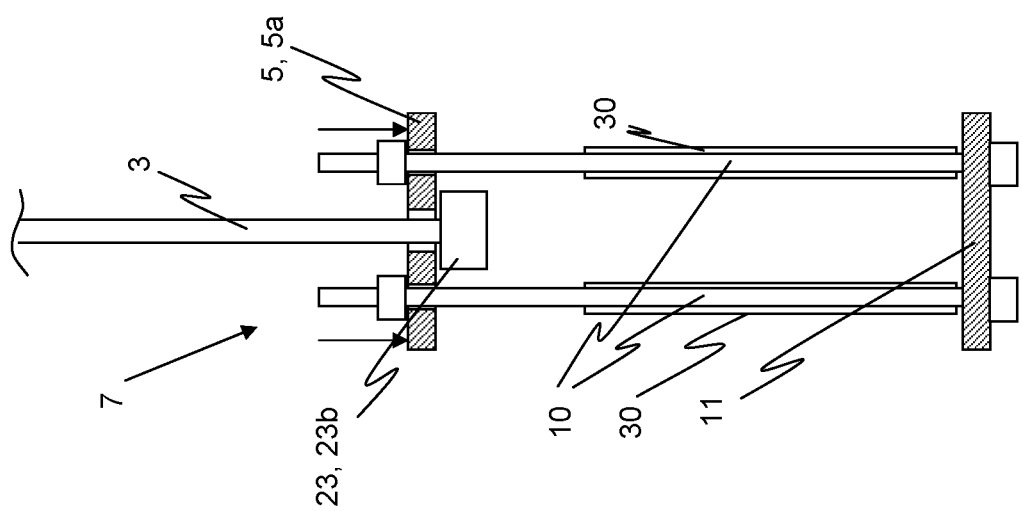

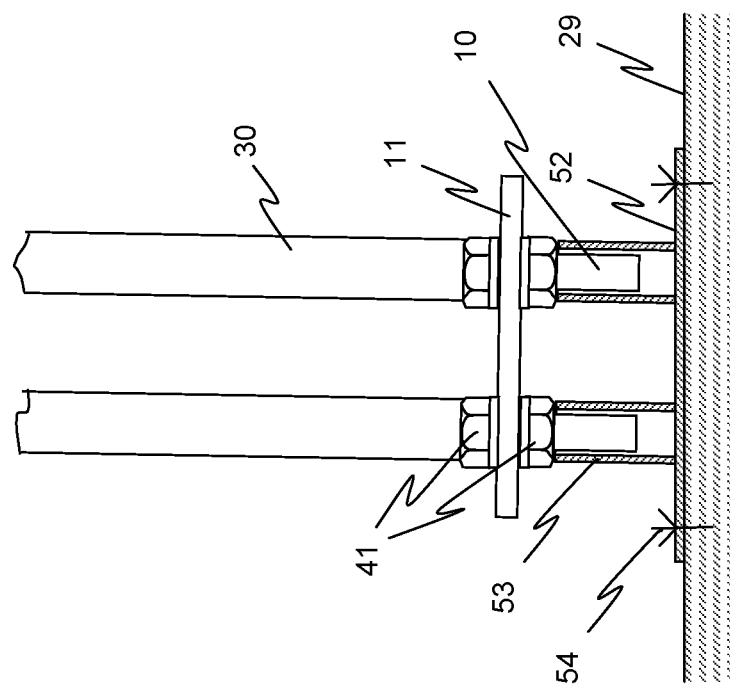

FOUNDATION FOR A STRUCTURE

CROSS REFERENCE TO RELATED APPLICATIONS

This application is a national stage of International Application No. PCT/EP2018/070900, filed Aug. 1, 2018, and claims benefit to German Application No. 10 2017 117 440.0, filed Aug. 1, 2017, German Application No. 10 2017 120 526.8, filed Sep. 6, 2017, and German Application No. 10 2018 107 421.2, filed Mar. 28, 2018, all of which are incorporated by reference herein.

TECHNICAL FIELD

The present disclosure refers to a foundation for a structure pre-stressed by means of a plurality of tensioning members, in particular for a tower or container, in particular for a wind power plant tower, wherein the plurality of tensioning members is anchored to the foundation with at least one anchor element that can be attached or connected to the foundation. The present disclosure also refers to a structure, in particular a tower or a container, in particular a wind power plant tower, which is pre-stressed by means of a plurality of tensioning members and that has foundation on which the plurality of tensioning members in anchored, as well as at least one anchor element on which at least one tensioning member of the plurality of tensioning members is anchored.

BACKGROUND

Pre-stressed structures like towers or containers as well as foundations for these structures have become known in many different designs. For example, it is known from wind power plant towers that steel towers are put together from individual steel tube sections, wherein the individual steel tube sections are screwed together at their flanges. In the foundation of such towers, anchor baskets with anchoring sleeves are cast for receiving anchor bolts that project from the foundation and on which in each case the lowest steel tube section can then be fixed. Such a foundation is known, for example, from DE 10 2009 016 892 A1.

Furthermore, concrete towers and hybrid towers for wind power plants are known. For example, such towers are built from ring-shaped or ring segment-shaped prefabricated concrete parts, arranged on top of one another and pre-stressed by tensioning members. In this case, the ring-shaped or ring segment-shaped prefabricated concrete parts can be designed in the shape of a circular ring or in a traverse way. Here, the tensioning members are anchored with one of their ends to the upper end of the concrete tower or also to one of the prefabricated concrete parts in a middle area and with their other end guided through all the way to the foundation and anchored there. In order to anchor the tensioning members in the foundation so that the pre-stressing force can be implemented, a larger recess known as tensioning basement is provided on the bottom side of the foundation. This is used to apply the pre-stress with tensioning jacks. Because of this, the foundation has, for example, a kind of ring-shaped console through which the tensioning members are guided through and beneath which they are anchored in the tensioning basement. Such a foundation is known, for example, from EP 1 262 614 B2 or DE 10 2015 219 655 A1. Owing to the tensioning basement and the console, the foundation must have a comparably massive design and be provided with a strong reinforcement in order to facilitate the load transfer by the tensioning members and the further load transfer through the console into the actual foundation slab.

FIG. 1 shows a tower 1 according to the state of the art pre-stressed by a plurality of tensioning members 3. The tower 1 shown here is built from a plurality of prefabricated concrete parts 4, which are arranged on top of one another on a foundation 2 and braced with it by means of the tensioning members 3. In order to attach the prefabricated concrete parts 4 to the foundation 2, the tensioning members 3 are guided from an upper anchoring device (not shown here), which can be an upper prefabricated concrete part or a spanner especially designed for the anchoring of the tensioning members, to the foundation 2, where they are likewise anchored with an anchor 23. Here, either in the area of the foundation 2 or in the area of the head bearing—if need be also on both ends of the tensioning members 3—the anchor 23 is executed in a known way in order to facilitate the bracing of the tensioning members 3.

The foundation 2 contains the actual foundation slab 27, which in this case has a trapezoidal cross section with regard to a direction of cutting from the upper side 9 to the bottom side 8 of the foundation 2 and a console-like projection 22. In the interior space 16 of the foundation 2, a tensioning basement 26 has been provided, in which both a tensioning jack (not shown here) is positioned and the tensioning members 3 can be stressed and the tensioning anchor 23 can be anchored. The console-like projection 22, through which the tensioning members 3 are guided through and can be anchored below the projection, results from the tensioning basement 26. For this purpose, cladding tubes 6 and anchor elements 5 on the underside, for example anchor plates, are cast into the console-like projection 22. In addition, the upper side 9, the bottom side 8 and the outer side 15 of the foundation 2 as well as the bottom 24 surrounding the foundation 2 are shown.

In order to transfer the load introduced by the tensioning members 3 and the prefabricated concrete parts 4 from the console-like projection 22 to the actual foundation slab 27 and receive the tensile stresses that occur due to the eccentric load transfer, a comparably massive reinforcement 17 is provided, especially in the transition area between the projection 22 and the foundation slab 27. So a load-resistant reinforcement 17 can be introduced, a plurality of partially complexly formed reinforcement bars 18 is needed here that are often placed individually in the formwork and must be fixed. Due to the strong reinforcement 17 of the foundation 2, empty conduits 13 for electrical cables and the like must be fed through an empty conduit ditch 14 below the foundation 2, something that requires significant excavation work. To ensure access to the tensioning basement 26, additional constructions like stairs or ladders (not shown here) must be provided. In order to prevent water or moisture to penetrate the tensioning basement 26, it is furthermore necessary to provide below the foundation 2a a watertight bottom plate 28 above a granular subbase 29.

Such a foundation construction according to the state of the art allows the tensioning members 3 to be received securely in the foundation 2 and a reliable load transfer in the actual foundation slab 27, but the manufacturing is relatively expensive and needs a very massive foundation with the corresponding substantial usage of material.

SUMMARY

It is a purpose of the present disclosure to suggest a foundation that can be easily manufactured and nonetheless allow a good load transfer. Moreover, a corresponding structure should be suggested.

The features of the disclosed subject matter fulfill the purpose.

A foundation for a structure pre-stressed by means of a plurality of tensioning members, for example a structure made of concrete, in particular for a tower or container, in particular for a wind turbine tower, can be attached with at least one anchor element for anchoring a plurality of tensioning members.

To facilitate the anchoring of the tensioning members, it is now provided for the foundation to include at least one suspension device cast into the foundation that extends all the way to the upper side of the foundation or beyond. The suspension device includes in this case a lower anchoring cast into the foundation, especially a lower anchor plate, and can be attached with the at least one anchor element. For the anchoring, sleeves, dowels or other anchors can be used in addition to the anchor plates. The lower anchoring, especially the lower anchor plate, is cast inside a lower third of a foundation slab of the foundation. According to an alternative design, the suspension device includes a lower anchoring, which is anchored underneath the foundation slab of the foundation in the subsoil. Standard elements like rock anchors and the like can be used as anchorings for this. A pre-stress can be applied with the suspension device to a load transfer area of the foundation, which extends above the lower anchoring or anchor plate to the upper side of the foundation.

Likewise, it is provided in a structure, in particular in a wind turbine tower or container, which is pre-stressed by means of a plurality of tensioning members and that has a foundation and at least one anchoring element connected to the foundation to anchor the tensioning members, that the foundation be provided with at least one such suspension device cast into the foundation. Here, the at least one anchor element is connected to the at least one suspension device. Alternately, the lower anchoring is anchored underneath the foundation slab of the foundation in the subsoil.

In a method for manufacturing a structure pre-stressed with a plurality of tensioning members in which the plurality of tensioning members is anchored to the foundation by means of at least one anchor element, at least one such suspension device is cast accordingly in the foundation. The at least one anchor element is attached to the suspension device and a pre-stress is applied to the foundation by means of the suspension device.

Within the framework of this application, a suspension device is here understood to be a structure that, in addition to an anchor element, is cast into a structural component to fasten adjoining components in the vicinity of this anchor element and which transfers the forces applied through the anchor element to deeper load-absorbing concrete layers and distribute them there. As a result of this, the concrete is prevented from breaking out in the anchoring area of the anchor element.

In this case, the structure has a tubular or circular section, for example, arranged on the foundation and made preferably of concrete, which can be executed either as in-situ concrete structure or, according to a preferred design of the disclosure, consisting of prefabricated concrete parts. Preferably, the structure consists of ring-shaped or ring segment-shaped prefabricated concrete parts pre-stressed against one another by means of the tensioning members and braced with the foundation.

According to the present disclosure, the suspension device is now not only guided into the deeper concrete layers but also extends at least down to the lower third of a foundation slab of the foundation, preferably to a bottom side of the foundation or its foundation slab. By means of the suspension device it is now possible to introduce the forces from the pre-stress of the tensioning members across the lower, cast anchoring, especially a lower anchor plate, in the lower third of the foundation slab, preferably directly on the bottom side of the foundation slab, so that not only an upper layer, but at least two thirds of the height of the foundation slab, preferably the entire height of the foundation slab, can be used to absorb the load. Unlike the console of the state of the art, the force is introduced into the foundation slab without a lever, directly under the tensioning members, so that significantly lower tensile loads occur in the foundation. As a result of this, the foundation can be built smaller and in a more simplified way, especially also without the costly tensioning basement. Likewise, the amount of reinforcement in the foundation can be significantly reduced because of this and the reinforcements can be built in more easily and quickly. Furthermore, it is advantageous here that the tensioning members are now no longer anchored, as before, in the tensioning basement below the foundation or console, but on the upper side of the foundation, where access is considerably easier. This facilitates the assembly and servicing of the tower.

Advantageous in the structure is also when the tensioning members are pre-stressed in such a way or pre-stressed during the method in such a way that a load transfer area of the foundation is always overcompressed in the loading condition of the operating state or in the operation according to plan, i.e. the concrete is pre-stressed in such a way, at least in the load transfer area, that no tension loads occur in the operating state as planned. Thus, by means of the tensioning members not only is the structure arranged on the foundation, for example the prefabricated concrete parts of the structure arranged on top of one another, but the foundation itself is provided at the same time with a pre-stress. Due to the pre-stress, the foundation can be executed in an even more compact way. Another significant advantage of the pre-stressed foundation is that this achieves a significantly more resistant construction with regard to fatigue. Thus, in the state of the art, there were often horizontal cracks in the foundation under tensile load, which work under a changing load, i.e. constantly come and go, thereby continuing to spread ("pump effect"). Now, the overcompressed foundation can counteract this through the operational state according to plan or regular operation. The tensioning members are in this case preferably pre-stressed with a collet.

For attachment to the tensioning members, preferably above the foundation, the suspension device is attached to the anchor element, on which one tensioning anchor of at least one tensioning member of the plurality of tensioning members is anchored. Here, the anchor element can be firmly attached to the suspension device by welding, for example, or also executed as one single piece with it. Likewise, it is also possible, however, for the anchor element to be attached to the suspension device in a detachable or adjustable way.

Besides that, it is advantageous in the structure if the tensioning members are guided as external tensioning members outside a wall of the structure. If the structure is built from prefabricated concrete parts, then these can be executed more simply as a result of this because no tensioning ducts must be provided. Likewise, in a structure made of in-situ concrete, it is not necessary to provide it with tensioning ducts. Even the stressing and subsequent and continuous servicing of the tensioning members is facilitated because, as external tensioning members, they are much more accessible.

In the foundation, it is furthermore advantageous if the foundation slab of the foundation is executed as closed foundation slab without interior space. Since a tensioning basement for anchoring the tensioning members is not needed in the suggested foundation, the manufacturing of the foundation is facilitated as a result of this. Neither a formwork for an interior space must be provided nor is it necessary to adapt the reinforcement configuration to such an interior space. Rather, the foundation slab can be continuously concreted in an easy way. It is also more advantageous here that the reinforcement in form of rectangular reinforcement meshes can be laid continuously and with reinforcement bars oriented in orthogonal fashion to one another and not, as in the state of the art, required to be placed radially around the interior space.

Here, it is preferable to provide at least one recess on the upper side of the closed foundation slab, preferably a cylindrical recess, extending from the upper side of the closed foundation slab through a part of the foundation height. It can therefore serve as extension of an empty conduit cast into the foundation. Preferably, the recess is covered with a cover.

It is also advantageous in the foundation if the suspension device includes at least one longitudinal element, preferably an anchor rod, for attaching the lower anchor plate to the anchor element. Here, the at least one longitudinal element is at least firmly attached to the lower anchor plate and serves to transfer the forces of the tensioning members uniformly from the anchor element to the lower anchor plate. Preferably, at least two longitudinal elements are provided, as the forces can be transferred especially uniformly to the lower anchoring as a result of this. The longitudinal element(s) can, for example, be executed as rope-like connections, wires, braids, steel pipes, steel plates, anchor rods, carbon rods or carbon plates and the like. It is advantageous if the at least two longitudinal elements are executed as anchor rods because they are economical and available in various sizes.

It is advantageous if the anchor element is attached to the suspension device and thus becomes part of it. As a result of this, the anchor element forms a space to receive a tensioning anchor of one tensioning member of the plurality of tensioning members.

It is especially advantageous if the anchor element is executed as an upper anchor plate arranged above the foundation.

Here, according to a first design, it can be provided for the anchor element to be firmly attached to the suspension device, in particular to the at least one longitudinal element of the suspension device and/or executed as one single piece with it. In this case, the suspension device forms a kind of solid frame.

However, according to another design, it is just as advantageous if the anchor element is connected or can be adjustably attached to the at least one longitudinal element of the suspension device. Here, it is advantageous if the suspension device includes at least two anchor rods, although an adjustable attachment of the anchor element with only one longitudinal element is conceivable in principle. By adjusting the anchor element with regard to the height of the longitudinal elements, it is possible to prestress the longitudinal elements and thereby also the foundation and with it also the tensioning members at the same time. As a result of this, it is also possible to use simple and economical tensioning members with two fixed anchors. Also advantageous in this case is that several and smaller tensioning jacks are placed at the same time above the upper anchor elements, where easier access is possible, to achieve this.

It is furthermore advantageous if the longitudinal element of the suspension device is surrounded by an envelope made of friction-reducing material. Because of this, the longitudinal elements are statically decoupled when making contact with the foundation slab, so that the force from the tensioning members can be selectively initiated through the longitudinal elements to the lower anchoring and from there to the foundation slab.

According to a further design of the disclosure, a plurality of suspension devices are cast into the foundation, wherein preferably each one of the suspension devices is connected or can be attached in each case to an anchor element. Thus, an own suspension device is assigned to each tensioning member, with which it can be attached in each case with an anchor element. The handling of the suspension devices in the manufacturing of the foundation and the stressing of the tensioning members is facilitated because of this. Naturally, however, it is also conceivable to provide an anchor element on which several tensioning members can be anchored, for example, side by side.

It is furthermore advantageous if the suspension devices include in each case at least two longitudinal elements, in particular two anchor rods, and the two longitudinal elements are preferably arranged horizontally behind one another in radial direction of the foundation. Provided the foundation is not executed in a round shape, a radial direction is understood to be all directions spreading outward from the center of the foundation. The radial arrangement of positioning one behind another improves the accessibility of the suspension devices for the placement of the tensioning jacks while simultaneously allowing a space-saving arrangement of the suspension devices. Such a radial arrangement of the suspension devices or anchor rods also offers the possibility to arrange two tensioning jacks offset in each case by 90° with regard to the anchor rods or longitudinal elements, i.e. largely lying side by side in circumferential direction of the foundation. As a result of this, a very compact design of the upper anchor plate can be achieved.

Naturally, it would also be alternately conceivable to arrange the longitudinal elements of the suspension devices horizontally beside to one another in circumferential direction of the foundation and then arrange the tensioning jacks, in turn, in orthogonal fashion with respect to the longitudinal elements, i.e. now lying radially behind one another. In the method for manufacturing the structure or the foundation, it is advantageous if the suspension devices with two longitudinal elements in each case and a common lower anchor plate in each case are pre-assembled and placed as pre-assembly perimeter in the formwork. This allows economical and reproducible manufacturing as well as unerring implementation of the corrosion protection of the suspension devices while at the same time facilitating in the construction site the arrangement of the suspension devices in the formwork.

If suspension devices with several longitudinal elements or anchor rods are used, then to tighten the tensioning members it is advantageous not to position the tensioning jacks aligned with the two or more longitudinal elements but offset to them. Because of this, the longitudinal elements or suspension devices and the tensioning jacks can be accommodated in a very small space, thereby improving the accessibility of the suspension devices and the anchor plates can be executed very compactly. As has already been pointed out, it is advantageous in a suspension device with two longitudinal elements to arrange the tensioning jacks in orthogonal fashion to the longitudinal elements. If the suspension device has several longitudinal elements, then it is advantageous to position the tensioning jacks at least partially between the longitudinal elements too in order to achieve a compact arrangement.

In order to position the suspension devices in the right position in the formwork, it is advantageous if a template is placed first on a granular subbase and/or in a formwork of the foundation as positioning device for erecting the suspension devices and then, using the template, place the suspension devices in the right position with regard to the foundation to be cast. Here, the template preferably allows the positioning of several suspension devices, preferably of all the suspension devices, that should be cast into the foundation. In connection with the described suspension devices, such a template is not only advantageous, but can also serve to position other anchor elements of cladding tubes or other elements and has therefore an inventive significance on its own.

According to an advantageous design, the template includes at least a preferably ring-shaped frame, wherein preferably a plurality of stops and/or positioning templates for positioning the suspension devices, in particular the pre-assembled suspension devices, are arranged on an outer or inner perimeter of the frame. Here, in the simplest case, the stops are executed by semicircular sections on the inner and/or outer perimeter of the frame. To position the suspension devices, the longitudinal elements of the suspension devices can be received in the semicircular sections. However, in this design, the longitudinal elements can only be individually positioned.

So the pre-assembled suspension devices described above can also be positioned with longitudinal elements in each case, it is advantageous if a plurality of positioning templates are arranged on the outer and/or inner perimeter of the frame. The positioning templates include in each case two stops for two longitudinal elements of the pre-assembled suspension devices. The positioning templates are preferably arranged radially outward on the frame and can be rigidly fixed on the frame according to a first design. According to another advantageous design, the positioning templates are detachably arranged on the frame to allow the removal of the template after concreting, since the suspension devices tilting inward would otherwise collide.

According to another preferred design, the stops are arranged in a foldable and/or movable way on the positioning templates and/or on the frame. Consequently, both the stops can be arranged individually in a foldable and/or movable way on the positioning templates or, owing to foldable or movable arrangement of the positioning templates on the frame, two stops can be moved in each case together relative to the frame. This design also allows the easy removal of the template after concreting, ideally from the already concreted foundation, i.e. without additionally needing to have special access to the stops.

According to another design, it is on the other hand advantageous if the lower anchoring or the lower anchor plate and/or the upper anchor plate have a ring-shaped design and extend preferably across the entire perimeter of the foundation. If the lower anchor plate has a ring-shaped design, then it can be attached with a plurality of longitudinal elements to one single suspension device, which can be cast as a whole into the foundation. As described above, the suspension device can then be attached to a plurality of upper anchor plates, on which a tensioning member is anchored in each case. Alternately, however, the upper anchor plate can also be provided as ring-shaped anchor plate, on which then all tensioning members can be anchored. The ring-shaped execution of the lower and upper anchor plate can offer advantages for the assembly when erecting or adjusting the suspension device.

Besides, it is advantageous if the foundation has a reinforcement consisting of several individual reinforcement steel meshes, preferably prefabricated, arranged on top of one another in the foundation. Due to the fact that the pre-stressing forces are now initiated in a lower third of the foundation slab, preferably directly on the bottom side of the foundation slab, via the suspension device and the foundation no longer has a tensioning console, elaborately shaped reinforcements which would have to be laid by hand are no longer needed. Rather, it is enough to use individual flat reinforcement meshes having a preferably rectangular basic shape that can be easily prefabricated and handled. Owing to the considerably simplified reinforcement with individual reinforcement steel meshes, it is also possible to introduce the reinforcement parallel or simultaneously to the formwork in various areas of the formwork because, contrary to the conventional reinforcements with complex shapes used thus far, no certain sequence must be followed. Therefore, it is also possible to introduce the suspension devices and the reinforcements at least chronologically parallel to one another. The erection of the structure can therefore take place faster.

Preferably, the reinforcement steel meshes are placed in such a way in the foundation that their reinforcement bars run in orthogonal fashion to one another. For example, individual reinforcement steel meshes can be used with reinforcement bars oriented parallel to each other that are then placed crosswise to one another in the foundation, so that the reinforcement bars of the several reinforcement steel meshes are placed overall in orthogonal fashion to one another.

An especially easy execution of the foundation results if the foundation or the foundation slab has an essentially rectangular cross section. This simplifies once more the arrangement of the reinforcements because a plurality of similar reinforcement meshes can be guided through prefabricated in the formwork. Reinforcement meshes with different diameters or lengths, the way they are necessary in a cross section with a trapezoidal sloping area, are therefore not needed. In addition, an advantageous heavier foundation is achieved than in a foundation sloping towards an outer side. Here, the cross section refers to a direction of cutting from the bottom side to the upper side of the foundation or through the vertical axis of the foundation. Expressed in another way, the cross section results from a cut surface that is radially oriented outwards from the center.

According to another embodiment of the disclosure, it is advantageous if the foundation has at least an empty conduit for feeding cables, wherein preferably the empty conduit runs from an outer side of the foundation to an interior space of the foundation or to the upper side. Due to the strongly reduced and simplified reinforcement, it is possible in the suggested foundation to introduce the empty conduits laterally into it. In contrast, in a foundation with a tensioning basement, extensive reinforcements are necessary, which strongly limit or even prevent the lateral introduction of empty conduits and require a ditch conduit under the foundation. In the suggested foundation, on the other hand, no empty conduit ditch is needed any longer, so that significantly less extensive excavation work is necessary than with a foundation having a tensioning basement.

It is furthermore advantageous if the foundation has a preferably ring-shaped projection on its upper side. The projection, however, could also be executed in circular shape. Here, the projection has a preferably rectangular cross section and is provided in an inner area spaced away from the outer side of the foundation and on the upper side of the actual foundation slab. Such a ring-shaped projection can also advantageously serve to receive the segments, especially the prefabricated concrete parts of the structure. It is additionally possible to fill the exterior of the area bordering the ring-shaped projection with earth to stabilize the foundation. As a result of this, the foundation—in spite of its slender construction—will get the necessary stability for operating a wind power plant, for example, with a relatively low weight. Preferably, the projection has a higher concrete quality than the foundation slab. For example, the projection is executed from a concrete having a maximum strength grade of C60/75 or higher. Because of this, the projection is especially well suited for receiving the forces coming from the pre-stressed structure.

According to another embodiment of the foundation, it is advantageous if the foundation has a casting channel on its upper side and at least two, preferably at least three, receiving elements, preferably threaded sleeves, in the area of the casting channel to receive adjusting elements, preferably adjusting screws, cast into the foundation. Here, the casting channel can be provided directly on an upper side of the foundation slab or also on a ring-shaped or circular projection on the actual foundation slab.

In a structure having a plurality of ring-shaped or ring segment-shaped prefabricated concrete parts there are arranged on top of one another on the foundation, accordingly between one or several lowest concrete prefabricated parts and the foundation at least two, preferably at least three, adjusting devices. These serve to align the lowest prefabricated concrete part(s) and thus the structure vertically on the foundation.

According to a first design of the adjusting device, it contains (as described above, for example) threaded sleeves and adjusting screws cast into the foundation, which can be used in the threaded sleeves cast into the casting channel. Here, the adjusting screws can have an enlarged head so that the lowest concrete ring or the lowest prefabricated concrete parts can be placed directly on the head of the adjusting screws without load distribution ring. The assembly of the adjusting devices is especially advantageous because the projection, contrary to the foundation slab, is reinforced considerably less.

According to another design, the adjusting device contains in each case at least one adjusting element, preferably at least one adjusting screw and/or an adjusting plate with at least one receiving element for the at least one adjusting element. Such adjusting devices with an adjusting plate can be loosely arranged in the casting channel and the lowest concrete ring or the lowest prefabricated concrete parts can likewise be placed directly on the upper side of the adjusting plates without load distribution ring.

Since such adjusting devices can also be used in other structures or also in connection with foundation without the suspension device described above, a foundation or a structure with such a suspension device and the adjusting device itself can also have inventive importance on its own.

BRIEF DESCRIPTION OF THE DRAWINGS

Additional advantages of the disclosure are described by means of the embodiments shown below, which show:

FIG. 3 is a schematic cross-sectional view of a foundation for a tower, in particular a wind turbine tower, according to another design, FIG. 4 is a schematic cross-sectional view of a foundation for a tower according to another alternative design, FIG. 5a is a detailed schematic cross-sectional view of a suspension device according to a first design in a schematic cross-sectional view, FIG. 5b is a schematic side view of the suspension device of FIG. 5a, FIG. 6a is a detailed schematic partial cross-sectional view of a suspension device according to a second design, FIG. 6b is a schematic side view of the suspension device of FIG. 6a, FIG. 7 is a detailed schematic cross-sectional view of a suspension device according to another design, FIG. 8 is a schematic cross-sectional view through the casting channel of a foundation with an adjusting device, FIGS. 9a, 9b, 9c are detailed top views of adjustment plates of an adjusting device 9b and 9c is according to various designs, FIG. 16 is a broken-off, partially sectional cut view of a positioning device with a hollow profile arranged on a base plate.

DETAILED DESCRIPTION

In the following description of the figures, the same references are used for the identical or at least comparable features and structural parts shown in the various figures. If a feature or structural part was already described with a figure, only the differences compared to the already described figures are examined in detail in the subsequent figures.

Figure 2:
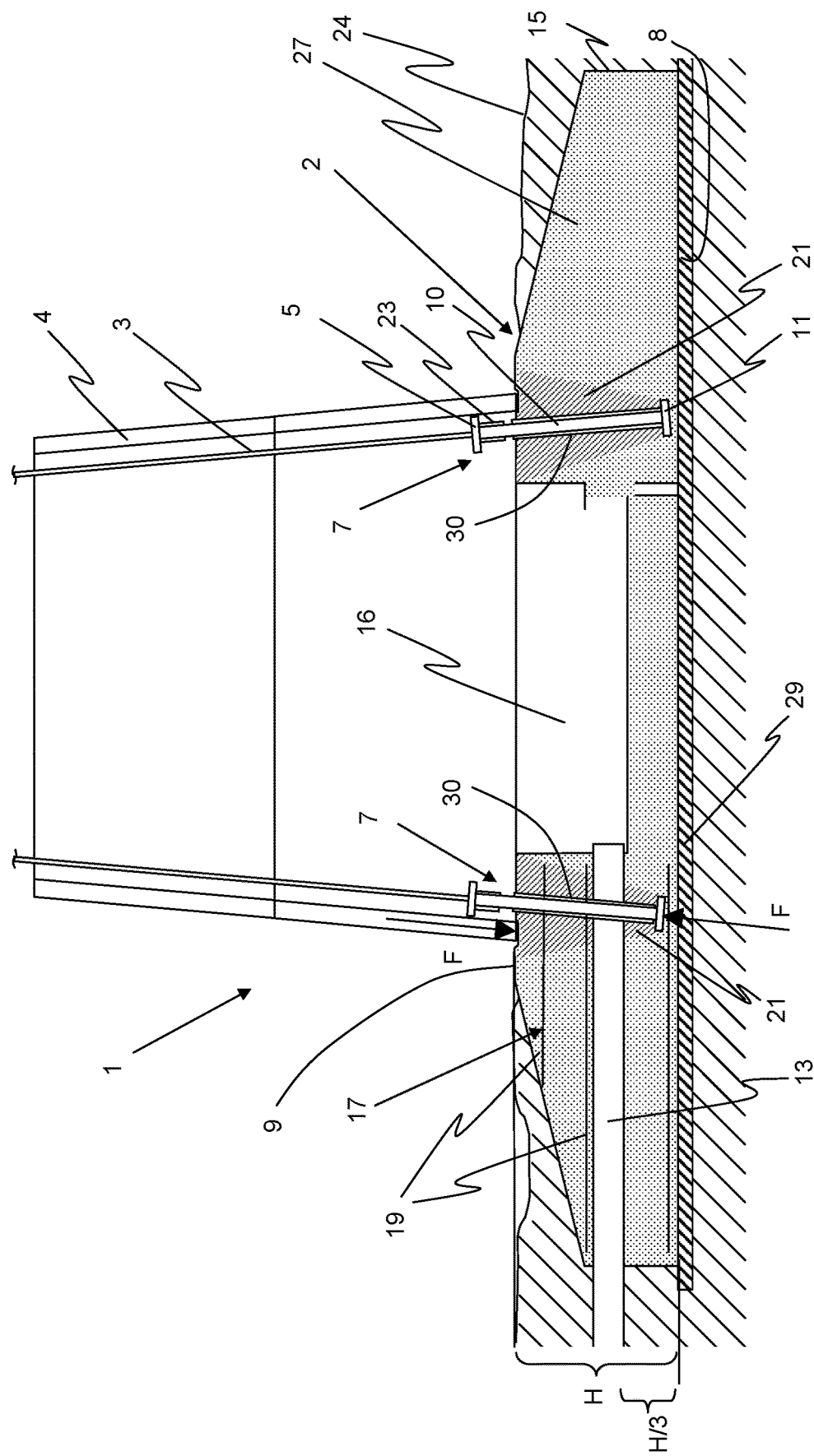
FIG. 2 is a schematic cross-sectional view of a base portion of a wind turbine tower with a foundation having a suspension device according to a first design.

FIG. 2 shows a tower 1 with a foundation 2 according to the present disclosure. Once again, the tower 1 is built here from several prefabricated concrete parts 4, pre-stressed with a plurality of tensioning members 3 and attached to the foundation 2. Basically, however, it is also possible to build a tower 1 braced by means of tensioning members 3 from steel segments or manufacture it in in-situ concrete. Moreover, the tensioning members 3 run here outside the formwork of the prefabricated concrete parts 4 as so-called external tensioning members. However, it is also possible to guide such tensioning members 3 in tensioning channels provided inside the formwork of the prefabricated concrete parts 4. To anchor the tensioning members 3 here, a plurality of anchor elements 5 is provided once again, wherein in each case one anchor element 5 of at least one of the tensioning members 3 is anchored.

A plurality of suspension devices 7 are cast into the foundation 2. Now, the tensioning members 3 are no longer guided through the foundation 2, but anchored to the suspension devices 7 cast into the foundation 2 by means of the anchor elements 5. In this case, the suspension devices 7 include in each case a lower anchoring cast on a bottom side 8 of the foundation 2, executed here as lower anchor plate 11, and they extend all the way to the upper side 9 of the foundation 2 or, as shown here, beyond. The anchor element 5, which is executed for example as anchor plate 5a (see FIGS. 5-7) can be here an integral part of the suspension device 7 or be executed as one single piece with it. Likewise, however, the anchor element 5 can also be a separate part, attached to the suspension device 7 assigned to it after completion of the foundation 2. In this case, the anchor elements 5 create in each case a receiving space for at least one anchor 23 of at least one tensioning member.

Now, unlike as in the state of the art, with the help of the suspension devices 7 the forces from the pre-stress are no longer introduced in an upper area or successively above the height of the foundation 2, but in a lower third H/3 of the foundation slab 27, in this case near the bottom side 8. The suspension devices 7, to be more precise, the longitudinal elements 10 of the suspension devices 7 described in more detail in FIGS. 4 to 7, are enclosed for this purpose by a tube-like envelope 30, preferably made of a friction-reducing material, so that they are statically decoupled from the foundation slab 27, so that making it possible to transfer a force to the lower anchor plate 11. In this case, it is advantageous if the tube-like envelope 30 has a thicker wall, i.e. the wall strength is preferably at least 5 mm, preferably at least 10 mm and preferentially less than 20 mm, or the envelope 30 surrounds the longitudinal element 10 with a circumferential tolerance or a play, preferably a play of at least 5 mm. Preferably, the play is at least 10 mm and preferentially less than 20 mm. Since the tensioning members must be guided without being kinked, it is necessary to position the suspension devices 7 very exactly in the foundation 2. Now, if the envelope 30 has been resiliently executed or the longitudinal element 10 surrounds with play, then the suspension device 7 can still be aligned and the tolerance requirements can be reduced when the suspension device 7 can be built in.

As a result of this, a significantly more uniform straining of the concrete can be achieved over the entire foundation height H, so that the foundation 2 can be executed more easily and less massively. Even the tensioning members 3 can be more easily tensioned because the pre-stressing level is no longer below the entrance level of the foundation 2 as in the state of the art, but is on or above it, where there is good access from the upper side 9 of the foundation 2. A tensioning basement 26 is no longer needed either, so that the sealing with a watertight bottom plate 28 below the foundation 2 can also be dispensed with. Therefore, separate access constructions for a tensioning basement 26 are no longer needed either. Naturally, it is still possible (as shown here) to provide an interior space 16 that can be variably executed inside the foundation 2, and can serve, for example, to receive structural parts or assembly aids already during the assembly of the tower 1.

In particular, however, due to the anchoring of the suspension devices 7 by means of the anchor plate 11 in the lower third of the foundation slab 27, when the tensioning members 3 are being tensioned, not only are the prefabricated concrete parts 4 pre-stressed but at the same time a pre-stress F is applied on the foundation 2 of the foundation slab 27, as symbolized by the two arrows in the left area of FIG. 2. Because of this, the foundation 2 is much better capable of absorbing the forces from the pre-stress and the dynamic forces in the operational state according to plan and as a result of this it can be executed in a significantly more slender way and with less material.

Here, the tensioning members 3 are preferably pre-stressed in such a way that the load transfer area 21 of the foundation 2 in the loading condition of the operational state according to plan, i.e. in the case of a wind power plant in regular operation, is constantly overcompressed. A load transfer area 21 is understood to be here at least the intended area extending conically upward above the lower anchor plates 11 all the way to the upper side 9 of the foundation 2. Also, the loading condition of the operational state according to plan or regular operation is understood to be here, the constant static loads occurring due to the weight forces of the tower 1 and of the parts arranged on the tower 1 as well as static and dynamic operational loads. Therefore, in the case of a wind power plant, the loading condition of the operational state according to plan includes, for example, the above-mentioned weight forces, the horizontal loads from the wind energy generation process, the dynamic loads from the rotor speed, the rotor blade passage as well as the wind loads typically occurring in this location. Therefore, owing to the fact that the foundation 2 is constantly overcompressed in the load transfer area in loading condition of the operational state according to plan or regular operation, it is not subject to any tensile stresses—at least in the operational state according to plan—which is advantageous with regard to the high dynamic fatigue. Distinct from this are the loading condition of the malfunctioning operation and special conditions such as extreme wind conditions or the like, in which isolated tensile stress conditions can be tolerated.

Figure 1:
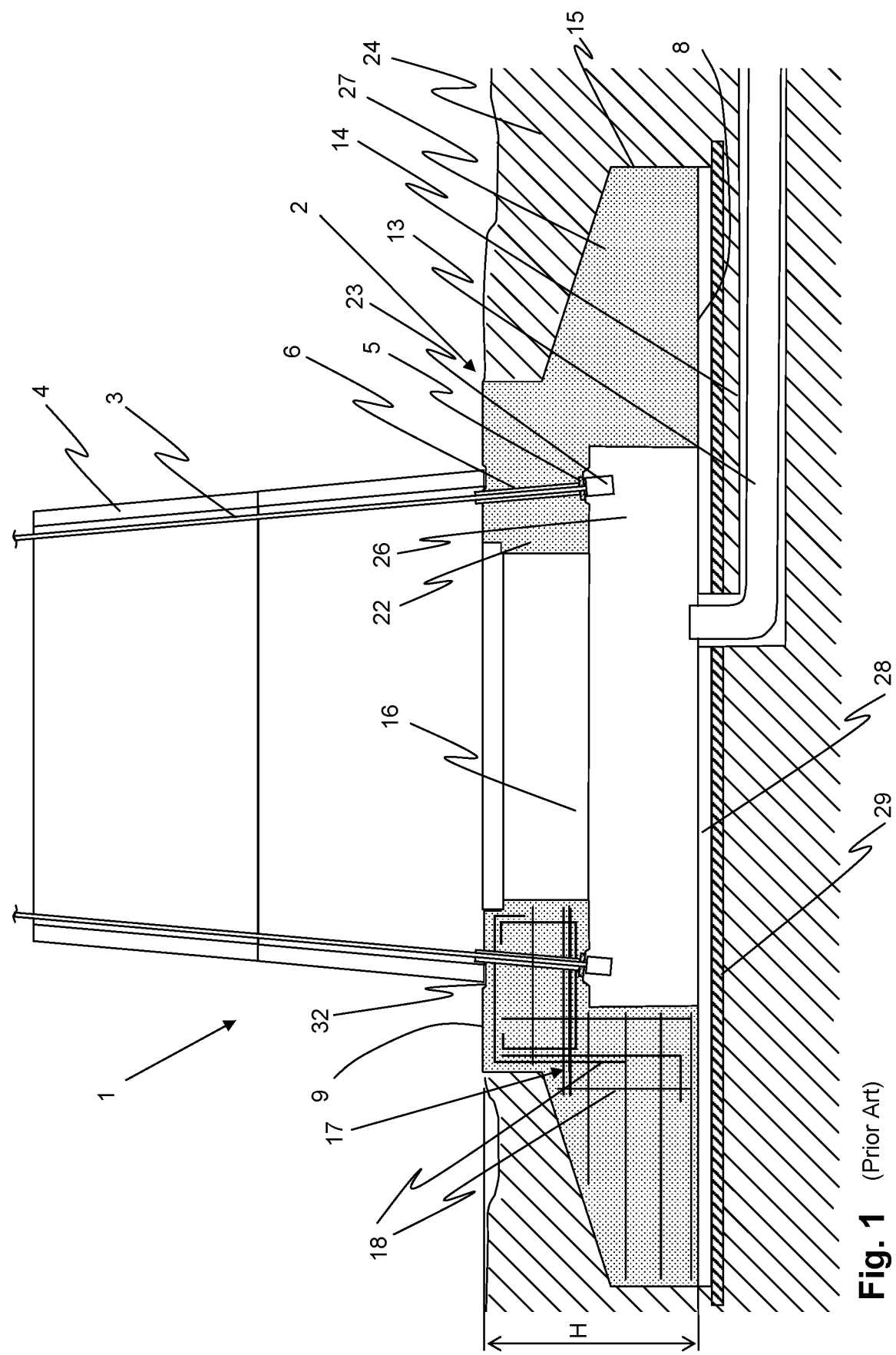
FIG. 1 is a schematic cross-sectional view of a base portion of a wind turbine tower with a foundation having a tensioning basement according to the state of the art.

As a result of this, the reinforcement 17 of the foundation 2 can be executed comparably easy, needing no specially pre-formed reinforcement bars 18. Rather, it is possible to use simple reinforcement steel meshes 19 that can have, for example, a basic rectangular shape and consist, for example, of parallel, where appropriate also of reinforcement bars laid in orthogonal fashion to one another, and can therefore be easily prefabricated according to the dimensions of the foundation 2 and placed in the formwork. For example, the rectangular reinforcement steel meshes 19 can be prefabricated with dimensions of 2.0 to 2.5 m width and 10 to 13 m length. The rectangular shape in connection with such dimensions allows easy transportation to the assembly location and easy handling on the construction site. This also facilitates the introduction of the reinforcement 17 into the formwork because only the individual reinforcement steel meshes 19 must be laid cross-wise in the formwork. In contrast, in the state of the art, with foundation 2 having a tensioning basement 26, it was necessary and expensive to provide to some extent multiple shaped reinforcement bars 18, which owing to their complex form, entail higher expenses when they are laid because the iron bars must be laboriously positioned for mutual overlap. Just as in FIG. 1, the reinforcements 17 are shown merely on a side of the foundation 2, although they are naturally present on the opposite side and surround the interior space 16 in a ring-shaped way. With regard to the suspension devices 7, it is advantageous if the lower anchor plate 11 is arranged as shown here, namely near the bottom side 8 of the foundation 2, but above the lowest reinforcement layer or the lowest reinforcement steel mesh 19.

The foundation 2 shown here has additionally at least one empty conduit 13 for feeding cables. Here, the empty conduit 13 is introduced into the foundation 2 from the outer side 15 her and runs from there to an interior space 16 of the foundation. Due to the considerably less quantity of reinforcements 17 needed compared to the state of the art, the introduction of empty conduits 13 through the foundation 2 is now possible without a problem.

FIG. 3 shows another design of the foundation 2. In contrast to the design of FIG. 2, this foundation 2 has a rectangular cross section and contains no interior space 16, but a closed foundation slab 27. As a result of this, the foundation 2 can be manufactured especially easily because the formwork can be easily built. In addition, the execution of the reinforcement 17 with reinforcement steel meshes 19 is facilitated once more because owing to the unchanging cross section and the lack of interior space 16, many similar reinforcement steel meshes 19 can be used and subsequently introduced continuously next to one another into the formwork. Besides, in a foundation 2 with a rectangular cross section, a higher weight is achieved compared to a sloping foundation 2, thereby obtaining an advantageous stabilization of the foundation, so that it is better able to absorb the operational loads. Here, the closed foundation slab 27 contributed to the weight increase.

The tower 1 with the prefabricated concrete parts 4 is not shown here, but merely the foundation 2 with the suspension devices 7. An empty conduit 13 has also been cast into the foundation 2 here. To simplify the laying of the empty conduit 13 in the foundation 2, the present foundation 2 has a recess 31 in the upper side of the closed foundation slab 27. Hence, a simple, straight empty conduit 13 can be used that must only be placed in such a way in the formwork that it ends inside the recess 31. The recess 31 is preferably covered with a cover not shown here. Inexpensive standard tubular elements can be used for the recess 31, for which there are already pre-assembled cover plates available in the market and can already be equipped with the necessary openings. However, it is naturally still possible to provide an empty conduit ditch 14 below the foundation 2 in every design of the foundation 2 with suspension devices 7. Furthermore, the anchor element 5 is also shown here as part of the suspension device 7. As already explained in FIG. 2, the anchor elements 5 can also be likewise provided as separated structural parts or the tensioning members 3 themselves can in each case include an anchor element 5, which can be directly attached to the suspension device 7.

FIG. 4 shows another design of the foundation 2. The foundation slab 27 of the foundation 2 is, like that of the foundation 2 of FIG. 2, executed in a way that slopes outward or has a trapezoidal cross section, but has a projection 20 on its upper side that is executed here in a cylindrical circular way. Like the foundation slab 27 of FIG. 3, it also contributes to add more weight to the foundation 2. In addition, the supporting area in the load transfer area 21 is increased. In order to improve the load-bearing capacity of the foundation 2 even more, the projection 20 (which could also be executed in a ring-shaped way) can be manufactured from higher quality concrete than the foundation slab 27. This is indicated here by the stronger hatching or dotting of the projection 20. In addition, the projection 20 allows excavation work 25 to be performed adjacent to it to stabilize the foundation 2 even more.

An empty conduit 13 has been cast in this case too, shown kinked here. Naturally, however, a recess 31 could also be arranged here, as shown in FIG. 3.

The suspension devices 7 of FIG. 4 are linearly oriented. For a cylindrical tower 1 or a cylindrical structure this is executed in such a way to obtain a straight, kink-free course of the tensioning members. In contrast, in a conical structure (see FIGS. 2 and 3), the suspension devices 7 are likewise concreted in an inclined way and therefore the inclination of the tensioning members 3 or the conicity of the structure is adapted. The tensioning members 3, which as external tensioning members 3 are guided near the wall of the structure or tower 1 can as a result of this be linearly attached to the suspension devices 7. The kinking of the tensioning members 3, which damages the tensioning members 3, can therefore be prevented. If the suspension devices 7 or their longitudinal element(s) 10 are received with a circumferential tolerance or a play in an envelope 30, as described above, or if this envelope 30 is resiliently executed, this also contributes to attach the tensioning members as linearly and kink-free as possible to the suspension devices 7. Moreover, by means of such envelopes 30, it is also possible to prevent water from penetrating the foundation 2 in the area of the suspension devices 7.

Figure 15:
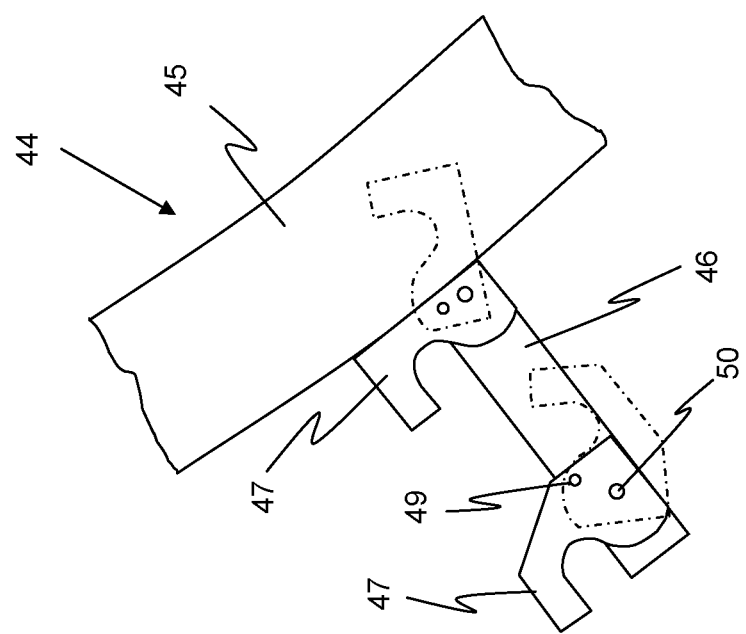
FIG. 15 is a detailed broken-off view of a template with movable stops for positioning the suspension devices.
Figure 14:
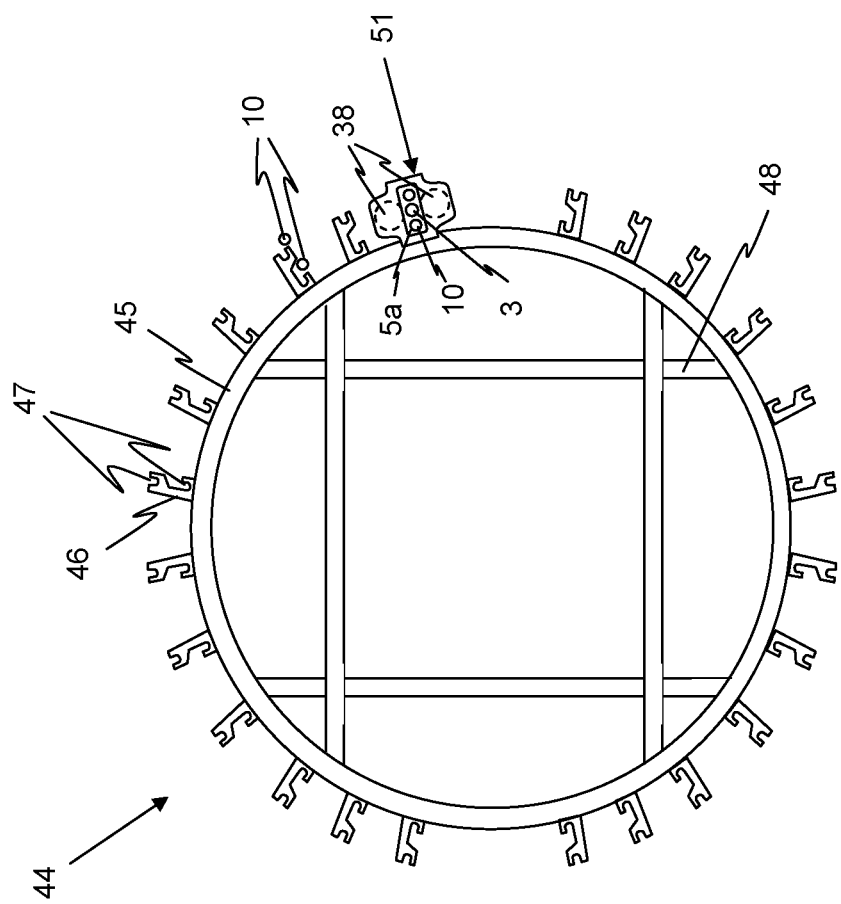
FIG. 14 is a top view of a template for positioning the suspension devices.

In order to adjust the position and, if need be, the inclination of the suspension device(s) 7 as exactly as possible, a positioning device can be advantageously used. It can be designed, for example, as positioning template or template 44, both for an individual suspension device 7 and jointly for several suspension devices 7, as shown in FIGS. 14 and 15, for example. Moreover, it is conceivable to measure the positioning device exactly, wherein the positioning device can also serve as temporary fixation element of the suspension device(s) 7 until the concreting work is completed. If necessary, the positioning device can also remain as lost fixation element in the foundation. It is additionally conceivable to position the suspension device(s) 7 by means of a programmable positioning robot that must be aligned only once on a reference position on the construction site.

It is advantageous if the positioning device is mounted after the lower reinforcement layer made of reinforcement steel meshes 19 has been built in. In this case, the positioning device can conveniently aligned with the help of the lower reinforcement layer and if necessary also be fixed on it. For example, this can be done with the help of perforated cones introduced on or in the lower reinforcement layer, where they can be anchored.

Also conceivable is an alignment and possibly also fixation of suspension devices 7 with the help of hollow profiles 53 as positioning device that have been measured in advance and project above the lower reinforcement layer. Such a positioning device is shown in FIG. 16. If the suspension devices 7 are pre-assembled in each case with two anchor rods or longitudinal element 10 (as will still be explained in FIG. 13), then a positioning device can include in each case, for example, two steel pipes welded on a base plate 52 as hollow profiles 53. This base plate 52, exactly measured, can be fixed directly on the granular subbase 29 with the suitable fastening elements 54, which can be screws. Before inserting the anchor rods or longitudinal elements 10, the hollow profiles 53 are preferably filled with mortar or grease. The longitudinal elements 10 or the pre-assembled suspension devices 7 can later be simply hoisted from above into the hollow profiles 53, wherein excess grease or mortar can escape through lateral openings in the hollow profiles 53 (not shown here).

The advantage with these positioning devices with hollow profiles 53 is that they do not have to be attached to the foundation 2 or reinforcement 17. The lower reinforcement layer can thus be built in without previously installing the suspension devices 7, so that these work steps are decoupled. Naturally, the alignment of the suspension devices 7 can also take place like this in the foundation 2 shown in the other figures.

Needless to say, a projection 20—as it is shown in FIG. 4—could also be provided to the foundation 2 shown in FIG. 3 and would there have the same advantages. Likewise, a kinked empty conduit 13 could also be used here, as shown in FIG. 4.

FIGS. 5-7 show various designs of suspension devices 7, wherein the suspension devices 7 are shown in each case with the tensioning members 3 in an attached state with the help of the anchor elements 5.

FIG. 5a shows the schematic cross-sectional diagram of a first design of a suspension device 7, whereas FIG. 5b shows a lateral view of the suspension device 7 of FIG. 5a. The suspension device 7 includes a lower anchor plate 11 and in this case an upper anchor plate 5a as anchor element 5. Here, the upper anchor plate 5a serves to anchor a tensioning member 3 with an anchor 23, here executed as tensioning anchor 23a. Firmly attached to the lower anchor plate are 2 longitudinal elements 10, executed here plate-shaped. The upper anchor plate 5a is also firmly attached to the longitudinal elements too, so that the suspension device 7 is executed in form of an extremely stable, massive frame. The individual parts of the suspension device 7 can be attached by welding them together, for example. Here, the suspension device 7 has furthermore stiffeners 12 that allow an especially good anchoring of the anchor plate 11 or suspension device 7 in the foundation 2 and thus a good force transfer. In this case, the longitudinal elements 10 are surrounding by a tube-like envelope 30 that allows a controlled load transfer via the lower anchor plate.

FIGS. 6a and 6b show another design of a suspension device 7, wherein FIG. 6a shows a schematic, partially cur front view and FIG. 6b a schematic lateral view. Unlike FIG. 5, the longitudinal elements 10 are provided here in form of anchor rods, thereby simplifying the manufacturing of the suspension device 7 because standard elements can be used in this case. The anchor 23 of the tensioning member 3 is here once again executed as tensioning anchor 23a.

In the suspension devices 7 of FIGS. 5 and 6, the upper anchor plate 5a and the lower anchor plate 11 are in each case firmly attached to one another by the longitudinal elements 10. The tensioning members 3 are stressed here in the traditional way with the tensioning anchor 23a, wherein due to the anchoring of the lower anchor plate 11 on the underside of the foundation 2, pre-stress is also applied to it. To stress the tensioning members 3, it is necessary here to place tensioning jacks below the upper anchor plates 5a or anchor elements 5.

FIG. 7 shows another design of a suspension device 7, in which the anchor element 5 is adjustably attached to the longitudinal elements 10, here once again two anchor rods. This design offers the possibility to pre-stress the longitudinal elements 10, wherein the anchor 23 of the tensioning member 3 supports the anchor element 5. Thus, by pre-stressing the longitudinal elements 10, the tensioning member 3 is also pre-stressed. It is therefore also possible to use a tensioning member 3 that has a fixed anchor 23b in both ends. To pre-stress the longitudinal elements 10 and thus simultaneously stressing the tensioning members 3, a tensioning jack can be placed above the upper anchor element 5, which will then press the anchor element 5 downward, as symbolized here by the two arrows above the anchor element 5. Advantageous here is that the two tensioning jacks arranged on the upper side of the anchor elements 5 are arranged in a space-saving way and therefore the anchor elements 5 can be executed more cheaply. In addition, there is a larger freedom of design for the suspension device 7 because no space for placing the comparatively large tensioning jacks must be provided below the anchor plate 5 and/or between the longitudinal elements 10. Therefore, it would also be conceivable in a suspension device 7 like the one in FIG. 5 to adjustably attach the upper anchor plate 5 to the longitudinal element(s) 10.

Here, the suspension device 7 shown in FIG. 7 offers also the possibility to compensate for the possible tolerances in the tensioning members 3 or in the pre-stress of the tensioning members 3 because each anchor rod or each longitudinal element 10 can be individually tensioned. This makes it possible to adapt the pre-stress in every single tensioning member 3, thereby achieving an optimal force transmission.

Figure 12:
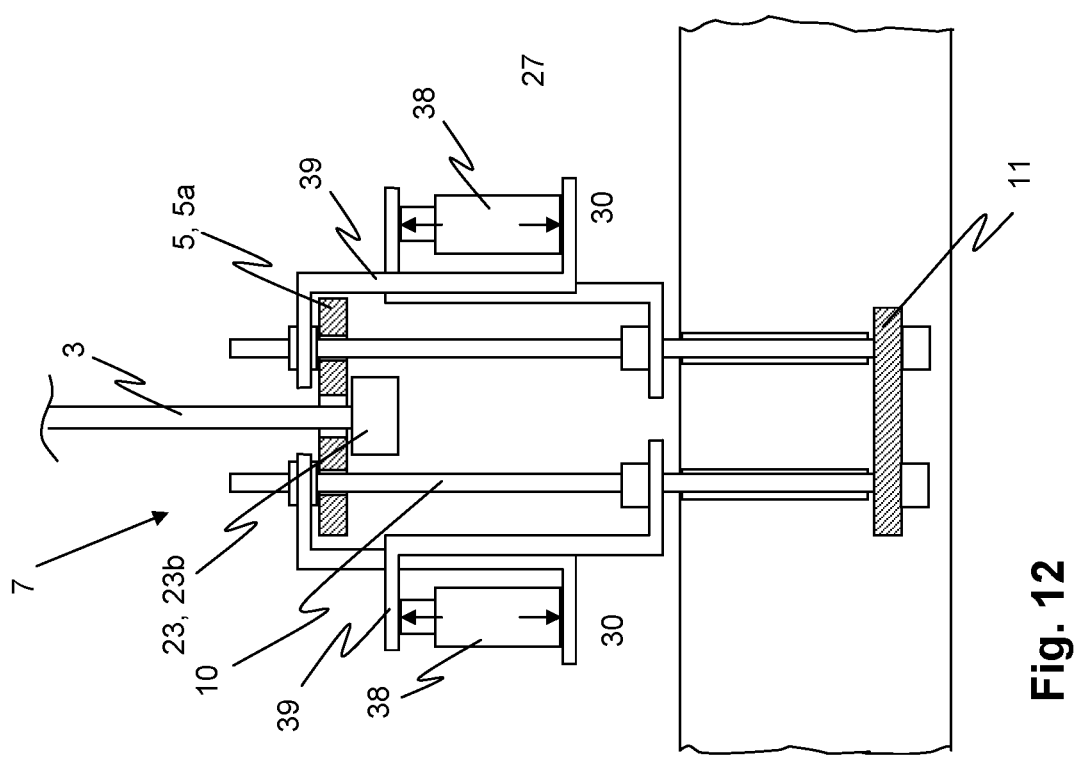
FIG. 12 is a schematic cross-sectional view of the stressing of the tensioning members by means of collets.

In all embodiments, the stressing of the tensioning members 3 can be accomplished in all embodiments, for example, by means of a traditional hollow piston jack as shown in FIGS. 5 and 6. Compared with this, FIG. 12 shows an alternative tensioning process, in which collets 39 are used. They can be placed in each case above the upper anchor elements 5 and on an anchoring of the longitudinal elements 10 and allow in advantageous fashion a pulling pre-stressing of the tensioning members 3. Since to do this, the collets 39 can engage at the suspension device 7, the upper anchor element 5 can be executed a lot smaller and thus save space. Moreover, simple and economical tensioning jacks 38 (without hollow pistons) can be used that are in addition substantially more resistant than the hollow piston jacks described above.

FIG. 8 shows a cross-sectional view through the casting channel 32 of a foundation 2 with an adjusting device 35.

Adjusting devices 35 are known in principle from the state of the art and serve to align the structure to be erected on the foundation 2, especially a wind turbine tower, in such a way that the structure will be vertical. In particular, it is often impossible or technically very costly to manufacture a precise horizontal and flat surface of the foundation 2. Likewise, prefabricated concrete parts 4, which should be built on the foundation 2, have often no flat contact surfaces perpendicularly oriented towards a vertical axis of the prefabricated concrete part 4. It is therefore necessary after casting to either still rework the foundation 2 and/or the prefabricated parts 4 or to use such adjusting devices 35 to align the structure on the foundation 2. Known adjusting devices 35 contain here a load distribution ring, which is either horizontally aligned on concreted anchor screws or on a self-leveled casting compound, and then is fully grouted. It is relatively costly to install such load distribution rings and the introduction and hardening of the casting compound often takes a relatively long time.

Figure 10:
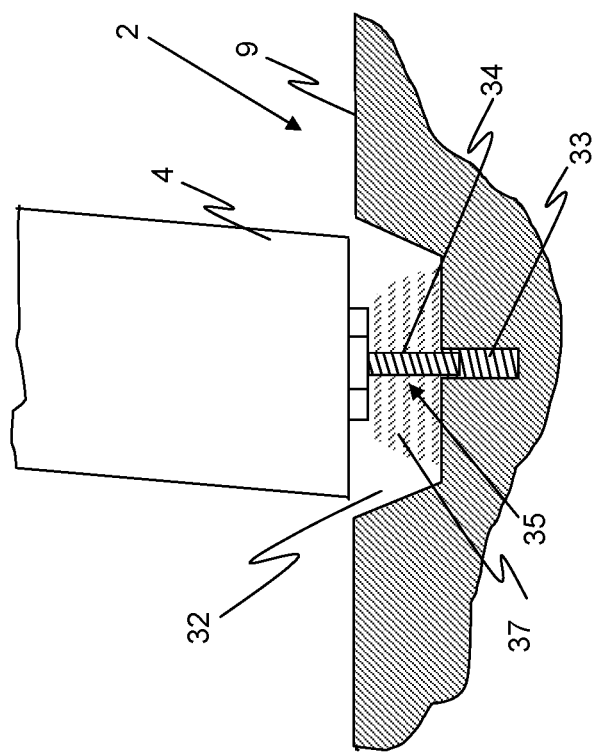
FIG. 10 is a schematic cross-sectional view through the casting channel of a foundation with an adjusting device according to another design.

On the other hand, the adjusting devices 35 shown in FIGS. 8 and 10 are characterized by having merely one adjusting element 34 such as an adjusting screw and, either cast a receiving element 33 such as a threaded sleeve or adjusting plate 36 containing at least such a receiving element 33 cast into the foundation 2. Here, the adjusting plates 36 or the adjusting elements 34 have a comparably large surface, so an additional load distribution ring is not necessary.

In the design according to FIG. 8, the adjusting device 35 contains an adjusting plate 36 that provides a relatively large surface on which the prefabricated concrete part 4, preferably polished in advance, can be placed directly and exactly on top. On its bottom side, the adjusting plate 36 has several receiving elements 33 to receive adjusting elements 34. In this case, the receiving elements 33 (see FIGS. 9*a* to *c*) are executed as internal threads, here as threaded sleeves introduced into the adjusting plate 36, and the adjusting elements 34 as adjusting screws. However, it could also be conceivable for the adjusting elements 34 to have an internal thread and to be screwed-on on bolt-shaped receiving elements 33. It is furthermore reasonable to execute the receiving elements 33 or adjusting elements 34 with a slip-resistant coating to prevent a change of the leveled state.

FIGS. 9*a*, 9*b* and 9*c* show a bottom view of various designs of adjusting plates 36 with receiving elements 33. The adjusting plates 36 can have various basis shapes like triangular, rectangular, round or oval and the like and also contain a varying number of receiving elements 33. However, according to an especially preferred design (as shown in FIG. 9*a*), the adjusting plate 36 has three receiving elements 33, since it can be aligned especially well in the casting channel 32.

As can now be gathered from FIG. 8, to assemble the lowest prefabricated concrete parts 4 it is only necessary to horizontally level the adjusting devices 35 with the adjusting screws or elements 34 and the adjusting plates 36 in the casting channel 32. An attachment of the adjusting elements 34 or adjusting plates 36 to the foundation 2 or prefabricated concrete part 4 is not necessary in this case. By moving the adjusting elements 34, it is now possible to align all the adjusting plates 36 placed in the casting channel 32 in such a way that they will form an exact horizontal surface for the prefabricated concrete part 4 to be placed on top. Naturally, it is also possible to place the prefabricated concrete part 4 on top and only then align it in such a way with the adjusting devices 35 that the structure is aligned exactly vertically. In this case, it is also possible to compensate for the manufacturing inaccuracies present in the lowest prefabricated concrete parts 4.

Figure 11:
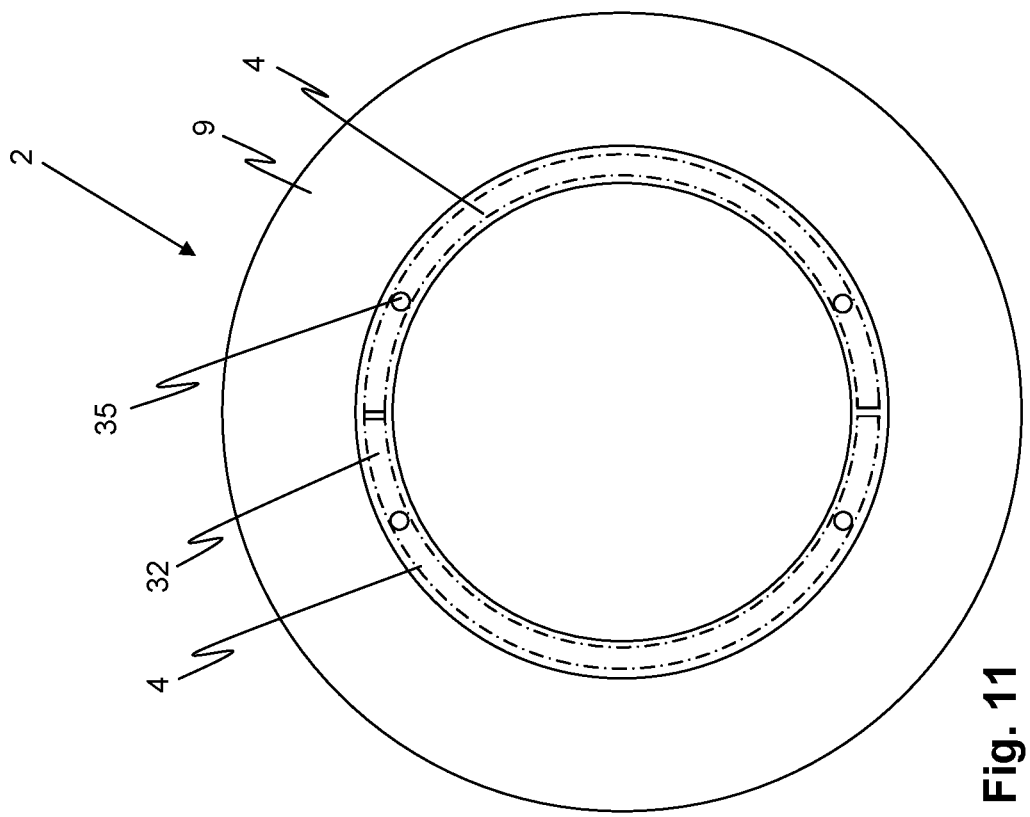
FIG. 11 is a schematic top view of a foundation with adjusting devices and of the prefabricated concrete parts arranged on the foundation.

FIG. 11 shows a schematic top view of a foundation 2 with adjusting devices 35 and prefabricated concrete parts 4 arranged on the foundation 2. Here, two ring segment-shaped prefabricated concrete parts 4 or executed as half shells are arranged on the foundation 2. So the prefabricated concrete parts 4 can be aligned on the foundation 2, at least two—preferably at least three—adjusting devices 35 per prefabricated concrete part 4 are provided. In this case, two adjusting devices 35 per prefabricated concrete part 4 are shown.

Since a relatively large surface is provided by the adjusting device 35 according to FIG. 8 by means of the adjusting plate 36, the prefabricated concrete parts 4 can already be aligned with just two adjusting devices 35 per prefabricated concrete part 4, especially when the adjusting plate 36 has three receiving elements 33 or includes three adjusting elements 34 (as shown in FIG. 9*a*). After adjusting the adjusting devices 35, a casting compound 37 is partially introduced merely in the area of the adjusting devices 35 in order to fix the adjusting devices 35 and ensure the load transfer on the foundation 2 in connection with the adjusting device 35. To improve the load transfer in connection with the casting compound 37, the adjusting plates 36 are preferably also made from a casting compound that can be hardened and has the similar mechanical properties of the casting material finally used. Here, it is also advantageous that the receiving elements 33 are also cast directly with the adjusting plates 36 during manufacturing. Since the casting compound 37 must only be introduced in the area of the adjusting device 35, it hardens relatively quickly or fast hardening casting materials can be used, so that the further erection of the structure is not delayed. The full casting of the casting channel 32 is not necessary for the load transfer in the assembled state of the first initial rings and can therefore take place later.

FIG. 10 shows a cross section through the casting channel 32 of a foundation 2 with another design of the adjusting device 35. In this case, the adjusting device 35 contains a receiving element 33 in the casting channel 32 cast into the foundation 2, here a threaded sleeve, and an adjusting element 34. The adjusting element 34 has been executed here as adjusting screw and has an enlarged head compared to the diameter of the adjusting screw. For example, the diameter of the head is at least five times greater than the diameter of the adjusting screw 34. Naturally, it could also be conceivable here to provide the receiving element 33 in form of a bolt, on which an adjusting element 34 can be screwed on with an internal thread. In both cases, it is also sensible to execute the receiving elements 33 or adjusting elements 34 with a slip-resistant coating to prevent a change of the leveled state.

Also in this design of the adjusting device 35, at least two adjusting devices 35 are provided once again per prefabricated concrete part 4, as in FIG. 11. Since the foundation 2 according to the present disclosure has significantly less reinforcement 17 and especially only few reinforcements 17 running mesh-like owing to the back-hanging construction in the area of its upper side 9 and thus also in the area of the casting channel 32, it is now possible to cast receiving elements 33 like dowels or anchors with internal thread in the foundation 2 with little effort. Therefore, the adjusting device 35 of FIG. 10 can be used very advantageously with a foundation 2 as described in FIGS. 2-4. In comparison, the adjusting device 35 of FIG. 8 can also be used in foundation 2 with a conventional reinforcement configuration, as they do not need elements encased in concrete.

In the adjusting device 35 of FIG. 10, a casting compound 37 can be introduced in the area of the adjusting device 35 to fix the adjusting device 35. Alternately or additionally to the introduction of a casting compound 37, however, it is also possible to use self-locking screws as adjusting elements 34. As a result of that, the adjusting device 35 is immediately fixed after the adjustment and the erection of the structure can be continued right away. Thus, the adjusting device 35 according to FIG. 10 makes it possible to erect the structure especially quickly.

Figure 13:
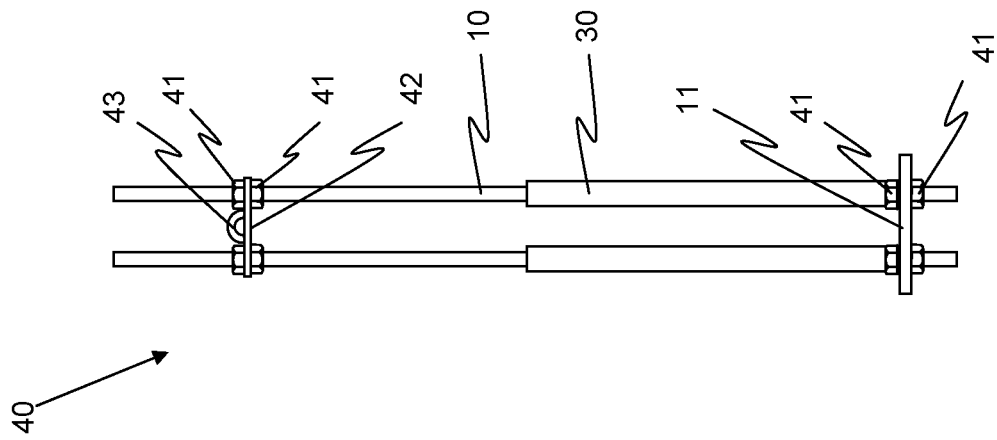
FIG. 13 is a detailed side view of a suspension device executed as pre-assembly perimeter with two longitudinal elements.

FIG. 13 shows a detailed diagram of a suspension device 7 executed as pre-assembly perimeter 40. The pre-assembly perimeter 40 includes here at least two longitudinal elements 10 and the lower anchor plate 11, here provided as common anchor plate 11, with which the anchor rods are attached in a known way with screw nuts 41. Furthermore, the envelopes 30 are already mounted on the anchor rods as well and closed in a waterproof way, e.g. wrapped with "DensoBand" to prevent water from entering while the foundation 2 is transported and manufactured. Preferably, the anchor rods or longitudinal elements 10 are provided with corrosion protection already during the pre-assembly, for example with zinc flake coating, which like the envelope 30, can also be applied very economically and reliably in the factory. As can be additionally gathered from the diagram, the two longitudinal elements 10 are here also attached above the anchor plate 11 by a stiffening element 42, for example a sheet metal, to prevent the longitudinal elements to change positions. Here, at the same time, the stiffening element 42 receives additionally an eyelet 43 for a crane hook, so a crane can hoist the package of pre-assembled suspension devices 7 in the positioning device and they can be tilted towards the center.

FIG. 14 shows a top view of a template 44, with which the suspension devices 7 can be advantageously arranged in the formwork of the foundation 2. Preferably, such a template is used in combination with the already described positioning devices with hollow profiles 53 (see FIG. 16), which can be directly fixed on the granular subbase 29. However, it is also conceivable to align the suspension devices 7 only with such a template and align them on their lower end and possibly align them in the formwork in another way.

The template 44 shown includes in this case a ring-shaped frame 45, on whose external perimeter a plurality of positioning templates 46 is rigidly arranged here in radially outward fashion. The positioning templates 46 consist, for example, of a sheet metal material and are welded to the frame 45. Each positioning template 46 has two stops 47 that are executed here as semi-circular recesses in der positioning template 46. The pre-assembled suspension devices 7 (see FIG. 13) can thus be advanced with their longitudinal elements 10 at first laterally to the positioning templates 46 and then introduced into the stops 47. In this case, only two longitudinal elements 10 are shown to symbolize the lifting of the suspension devices 7 into position.

The frame 45 becomes part of a supporting frame 48 by means of which it can be placed in the formwork of the foundation 2 or preferably directly on the granular subbase 29. In this case, the supporting frame 48 can also be executed to have several, dismountable parts. This has the advantage that the part of the supporting frame 48 that is also cast during concreting can be easily detached from the part of the supporting frames 48 that supports the frame 45, so that the latter can be reused together with the frame 45.

FIG. 15 shows a detailed broken-off view of another design of a template 44 in. The positioning templates 46 are likewise rigidly arranged on the frame 45, but have in each case two movable stops 47, here pivoted toward the positioning templates 46. Here, the stops 47—which can swivel in each case around a pivot point 50—are mounted on the positioning template 46 and can be locked in the position shown bare using a pin 49. In this locked position, the suspension devices 7 can be lifted as described for FIG. 14. After concreting, the pins 49 can be detached and the stops 47 folded out, so that the template 44 can then be easily removed without geometric collision.

The suspension devices 7 can be arranged in such a way with such a template that the two longitudinal elements 10 are arranged radially behind one another in the foundation, as is also apparent in FIG. 14. As a result of this, the upper anchor plates 5*a* or anchor elements 5 can be executed very compactly and good accessibility for the tensioning jacks 38 is achieved because they can be placed in orthogonal fashion to the two longitudinal elements, i.e. oriented essentially in circumferential direction. To illustrate this, a tensioning device 51 with two tensioning jacks 38 was schematically shown in FIG. 14, although in reality they are naturally placed only after removal of the template 44. Moreover, the upper anchor plate 5*a* of the suspension device 7 can be seen, through which the two longitudinal elements 10 and the tensioning member 3 pass.

The disclosure is not limited to the embodiments that have been shown and described. Thus, in this case, the disclosure was shown using a wind turbine tower made of prefabricated concrete parts as an example. The described foundation with one or several suspension devices is, however, suitable for every structure made of pre-stressed concrete in which the tensioning members that pre-stress the structure are expected to be anchored to the foundation. For example, the structure could also be a pre-stressed container that serves as water reservoir in a pump storage power plant. Furthermore, the described suspension device could also be used in a foundation for structures made of tubular steel segments or also segments made of other materials such as composites.

Furthermore, FIGS. 6 and 7 show suspension devices 7 that include in each case two longitudinal element 10 that have a common lower anchor plate 11. It is therefore also conceivable, however, to assign an own lower anchor plate 11 to each longitudinal element 10.

In addition, all features of the disclosure were described in a merely exemplary way by means of the figures. Needless to say, features and their combinations that were only described in one embodiment can also be present in other designs or in another combination. Further variations and combinations within the framework of the patent claims also fall within the disclosure.

LIST OF REFERENCE CHARACTERS

1 Tower
2 Foundation
3 Tensioning member
4 Prefabricated concrete part
5 Anchor element
5*a* upper anchor plate
6 Cladding tube
7 Suspension device
8 Bottom side of the foundation
9 Upper side of the foundation
10 Longitudinal element
11 Lower anchor plate
12 Stiffener
13 Empty conduit
14 Empty conduit ditch
15 Outer side of the foundation
16 Interior space of the foundation
17 Reinforcement
18 Reinforcement bar
19 Reinforcement steel mesh
20 Projection
21 Load transfer area
22 Console-like projection
23 Anchor of the tensioning member
23*a* Tensioning anchor
23*b* Fixed anchor
24 Bottom
25 Excavation work
26 Tensioning basement
27 Foundation slab
28 Base plate
29 Granular subbase
30 Envelope
31 Recess
32 Casting channel
33 Receiving element
34 Adjusting element
35 Adjusting device
36 Adjusting plate
37 Casting compound
38 Tensioning jack
39 Collet
40 Pre-assembly perimeter
41 Screw nut 42 Stiffening element
43 Eyelet
44 Template
45 Frame
46 Positioning template
47 Stop
48 Supporting frame
49 Pin
50 Pivot point
51 Tensioning device
52 Base plate
53 Hollow profile
54 Fastening element
H Height of the foundation slab
H/3 Lower third of the foundation slab
F Pre-tension
F Pre-tension

The invention claimed is:

1. A foundation for a structure pre-stressed via a plurality of tensioning members, the foundation comprising:
   a foundation slab; and
   a suspension device cast into the foundation slab and including an anchor element located at least as high as an upper side of the foundation slab, a lower anchor plate located at least as low as within a lower third of the foundation slab, and at least one longitudinal element connecting the anchor element to the lower anchor plate, the anchor element being attachable to one of the tensioning members for pre-stressing the foundation slab via the lower anchor plate.

2. The foundation according to claim 1, wherein the lower anchor plate is cast into a lower side of the foundation slab and the suspension device extends from the lower side to at least the upper side.

3. The foundation according to claim 1, wherein the anchor element includes an upper anchor plate connected to the at least one longitudinal element.

4. The foundation according to claim 3, wherein the upper anchor plate is adjustably attached to the at least one longitudinal element.

5. The foundation according to claim 1, wherein the longitudinal element is surrounded by an envelope configured for statically decoupling the longitudinal element from the foundation slab.

6. The foundation according to claim 1, wherein a plurality of the suspension devices are cast into the foundation slab.

7. The foundation according to claim 6, wherein the suspension devices each include two longitudinal elements, the two longitudinal elements being arranged horizontally adjacent each other in a radial direction of the foundation slab.

8. The foundation according to claim 1, wherein at least one of the lower anchor plate and the anchor element is configured for common attachment to at least two of the longitudinal elements.

9. The foundation according to claim 1, wherein the foundation slab is configured as a closed foundation slab, the foundation slab defining at least one recess in the upper side.

10. The foundation according to claim 9, wherein the foundation slab defines at least one empty conduit for the feeding of cables, the empty conduit extending from an outer side of the foundation slab to one of an interior space of the foundation slab, to the recess, or to the upper side.

11. The foundation according to claim 1, wherein the foundation slab includes a reinforcement having several prefabricated reinforcement steel meshes arranged vertically in the foundation slab, the reinforcement steel meshes each having a plurality of reinforcement bars oriented orthogonally to one another.

12. The foundation according to claim 1, wherein the foundation slab has a substantially rectangular cross section.

13. The foundation according to claim 1, wherein a ring-shaped projection is located on the upper side, the projection formed of a concrete having a higher quality than a concrete of the foundation slab.

14. The foundation according to claim 1, wherein the foundation slab defines a casting channel on the upper side and at least two receiving elements are cast into the foundation slab within the casting channel to receive adjusting elements for aligning the structure on the foundation slab.

15. A pre-stressed structure comprising:
    a plurality prefabricated concrete parts arranged in a stack;
    a foundation slab beneath the stack;
    a suspension device cast into the foundation slab and including an anchor element located at least as high as an upper side of the foundation slab, a lower anchor plate located at least as low as within a lower third of the foundation slab, and at least one longitudinal element connecting the anchor element to the lower anchor plate; and
    a plurality of tensioning members pre-stressing the prefabricated concrete parts, the anchor element being attachable to one of the tensioning members for pre-stressing the foundation slab via the lower anchor plate.

16. The pre-stressed structure according to claim 15, wherein the anchor element includes an upper anchor plate connected to the at least one longitudinal element.

17. The pre-stressed structure according to claim 16, wherein the upper anchor plate is adjustably attached to the at least one longitudinal element.

18. The pre-stressed structure according to claim 15, wherein the longitudinal element is surrounded by an envelope configured for statically decoupling the longitudinal element from the foundation slab.

19. A method of manufacturing a structure comprising:
    casting a foundation slab, including casting a suspension device into the foundation slab, the suspension device including an anchor element located at least as high as an upper side of the foundation slab, a lower anchor plate located at least as low as within a lower third of the foundation slab, and at least one longitudinal element connecting the anchor element to the lower anchor plate;
    placing the structure on the foundation slab; and
    attaching a tensioning member to the anchor element to pre-stress the structure and to pre-stress the foundation slab via the lower anchor plate.

20. The method according to claim 19, wherein the tensioning member is pre-stressed so that a load transfer area of the foundation slab is always over-compressed at least in a load condition, the tensioning members being tensioned via a collet.

21. The method according to claim 19, further including the step of positioning the longitudinal element within an envelope to statically decouple the longitudinal element from the foundation slab.

* * * * *